United States Patent
Vermeulen et al.

(10) Patent No.: US 9,383,572 B2
(45) Date of Patent: Jul. 5, 2016

(54) ELECTROWETTING DISPLAY DEVICE WITH A WALL ON A LOWER HYDROPHOBICITY AREA

(71) Applicant: Amazon Technologies, Inc., Seattle, WA (US)

(72) Inventors: Paul Vermeulen, Eindhoven (NL); Bruce Scott, Cambridge (GB); Mick Evans, Geldrop (NL); Ivar Schram, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/550,210

(22) Filed: Nov. 21, 2014

(65) Prior Publication Data
US 2015/0077834 A1 Mar. 19, 2015

Related U.S. Application Data

(63) Continuation of application No. 13/461,129, filed on May 1, 2012, now Pat. No. 8,896,903, which is a continuation of application No. PCT/EP2010/067141, filed on Nov. 9, 2010.

(30) Foreign Application Priority Data

Nov. 10, 2009 (GB) .................................. 0919652.8

(51) Int. Cl.
*G02B 26/00* (2006.01)
*G02B 26/02* (2006.01)
*G09G 3/34* (2006.01)

(52) U.S. Cl.
CPC ............ *G02B 26/005* (2013.01); *G02B 26/004* (2013.01); *G09G 3/348* (2013.01); *B01L 2400/0427* (2013.01); *B32B 2307/73* (2013.01); *G09G 3/3433* (2013.01)

(58) Field of Classification Search
CPC .... G02B 26/00; G02B 26/004; G02B 26/005; G02B 26/02; G09G 3/348; G09G 3/3433; G09G 3/3696; G09G 2300/06; G09G 2300/08; G09G 2300/0809; B01L 2400/04; B01L 2400/0427; B32B 2307/73; C23C 16/401; C23C 16/407
USPC ................. 359/290, 291, 295, 228, 245, 253; 345/41, 84, 211, 212, 214, 690; 216/13, 40; 427/58, 66; 29/825
See application file for complete search history.

(56) References Cited

U.S. PATENT DOCUMENTS 7,872,790 B2  1/2011  Steckl et al.
8,659,587 B2 *  2/2014  Slack .................. G09G 3/3433
                                              345/107

(Continued)

FOREIGN PATENT DOCUMENTS

CN       1791824 A       6/2006
CN     101493576 A       7/2009

(Continued)

OTHER PUBLICATIONS

Zhou, et al., "A Full Description of a Simple and Scalable Fabrication Process for Electrowetting Displays", Journal of Micromechanics and Microengineering, 19 (2009) 065029 (12pp.).

*Primary Examiner* — Loha Ben
(74) *Attorney, Agent, or Firm* — EIP US LLP

(57) ABSTRACT

An electrowetting display device includes a wall layer having a first part located on a first area of a surface of a hydrophobic layer and a second part located on a second area of the surface. The second area has a lower hydrophobicity than the first area.

20 Claims, 2 Drawing Sheets

(56) References Cited

U.S. PATENT DOCUMENTS

| | | |
|---|---|---|
| 8,743,450 B2 | 6/2014 | Massard et al. |
| 8,791,891 B2 * | 7/2014 | Van Dijk .................. G02B 3/14 345/41 |
| 9,052,501 B2 * | 6/2015 | Van Dijk .................. G02B 3/14 |
| 2003/0030884 A1 | 2/2003 | Minami |
| 2009/0168144 A1 | 7/2009 | Lo et al. |
| 2009/0191334 A1 | 7/2009 | Dai et al. |
| 2009/0284824 A1 | 11/2009 | Feenstra et al. |

FOREIGN PATENT DOCUMENTS

| | | |
|---|---|---|
| CN | 101517624 A | 8/2009 |
| JP | 2007511782 A | 5/2007 |
| JP | 2003114452 A | 4/2009 |
| JP | 2009210738 A | 9/2009 |
| JP | 2009251214 A | 10/2009 |
| WO | 03071346 A1 | 8/2003 |
| WO | 2004104671 A1 | 12/2004 |
| WO | 2007141220 A1 | 12/2007 |
| WO | 2009071676 A1 | 6/2009 |

* cited by examiner

ELECTROWETTING DISPLAY DEVICE WITH A WALL ON A LOWER HYDROPHOBICITY AREA

CROSS REFERENCE TO RELATED APPLICATIONS

This application claims the benefit of the following applications under 35 U.S.C. §120: (1) U.S. Ser. No. 13/461,129 filed May 1, 2012, now U.S. Pat. No. 8,896,903, (2) PCT/EP2010/067141 filed Nov. 9, 2010, which claims priority to GB 0919652.8 filed Nov. 10, 2009. The contents and teachings of these applications are hereby incorporated by reference in their entirety.

BACKGROUND

A known electrowetting display device includes two support plates. A pattern of walls is arranged on one of the support plates, the pattern defining the picture elements of the display device. The area between the walls of a picture element, also known as a pixel, is called the display region, over which a display effect occurs. The walls of the picture elements are made of a hydrophilic material. The area of the support plate in the display region must to a large extent be hydrophobic for a proper operation of the picture element. During manufacture the area of the support plate where the picture elements are located is covered by a hydrophobic layer. The walls are made on this layer by depositing a layer of wall material on the hydrophobic layer and patterning the layer of wall material using e.g. a photo-lithographic method.

The adhesion between the layer of wall material and the hydrophobic layer is relatively poor, causing easy peel off of the layer of wall material from the hydrophobic layer. It is known to lower the hydrophobicity of the hydrophobic layer prior to applying the layer of wall material. After the formation of the walls, the area of the hydrophobic layer between the walls is annealed to regain its hydrophobicity. However, the quality of display devices made using this method is not satisfactory.

DETAILED DESCRIPTION

Figure 1:
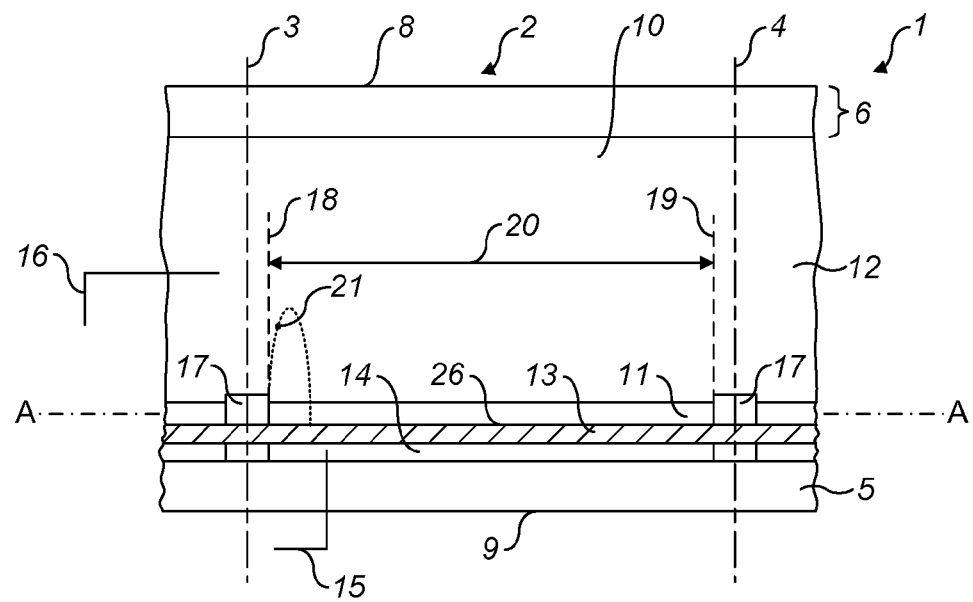
FIG. 1 shows a schematic cross section of a picture element of an electrowetting display device.

In accordance with embodiments, there is provided a method of making an electrowetting display device having a plurality of picture elements, each picture element being defined by walls surrounding a display region, the plurality of picture elements covering a first area of a support plate, the method comprising the steps of:
  applying a hydrophobic layer covering at least the first area;
  lowering the hydrophobicity of the hydrophobic layer over a second area substantially outside the display regions; and
  forming the walls on the hydrophobic layer over the first area.

Embodiments are based on the recognition that the unsatisfactory quality of the known display devices using the annealing step is due to the reduced quality of the surface of the hydrophobic layer caused by the steps of lowering and increasing the hydrophobicity. The reduced quality of the surface in the display region, i.e. the region of a picture element inside the walls, affects the lifetime of the display device and the reproducibility of the manufacturing process.

The method according to embodiments avoids this problem by first applying a hydrophobic layer to an area of the support plate completely covering the first area of the plurality of picture elements. Subsequently, the hydrophobicity of the hydrophobic layer is lowered locally, i.e. over a second area lying outside the display regions. The material of the walls adheres properly to the surface in the second area, thereby avoiding peel off of the material of the walls from the support plate. The second area may be a connected area or a plurality of separate areas. Since the second area is outside the display regions, the hydrophobicity of the hydrophobic layer in the display regions has not been lowered and, hence, there is no need to increase the hydrophobicity of the hydrophobic layer after the application of the walls. Therefore, the effect in the known display device caused by the cycle of reducing and increasing the hydrophobicity will not occur.

The method allows the application of walls without affecting the hydrophobic layer in the display region of each picture element. The hydrophobic layer in the display regions has not undergone the hydrophobicity lowering and increasing treatment, thereby leaving its surface intact. Hence, the display device made with the method according to embodiments does not suffer from a reduced lifetime; moreover, the manufacturing process has a good reproducibility.

The phrase 'substantially outside the display regions' means that less than 10% of a display region has a lowered hydrophobicity. In an embodiment the second area is completely outside the display regions.

It is noted that a known method uses a different process to avoid the above-mentioned peel off of the layer of wall material and improve the adhesion of the walls. The known method first deposits the hydrophobic layer on the support plate covering the entire area of the display. Subsequently the hydrophobic layer is patterned by removing the layer over the area where the walls are to be made. The walls are applied on this cleared area and adhere to the layer underneath the hydrophobic layer, thereby improving the adhesion of the walls to the support plate. A feature of patterning the hydrophobic layer is that the patterning and the subsequent alignment of the walls must be very accurate, as the hydrophobic layer is also used as an insulating layer between the liquids in the picture element and an electrode, either on its own or together with another dielectric layer. Any opening between the patterned hydrophobic layer and the walls may cause a disabling short-circuit between the fluids and the electrode. A second feature of this known method is that the adhesion of the hydrophobic layer and the support plate is relatively weak. After the hydrophobic layer has been patterned, it has a high risk of delaminating from the support plate during the sequel of the process used to make the display device, for example during the subsequent wet process steps such as cleaning, solution coating and other steps. The hydrophobic layer in the method according to embodiments is not patterned and edges of the hydrophobic layer, lying outside the plurality of picture elements, can be protected against water intrusion during the manufacturing process.

In an embodiment, suitable for smaller display devices, the second area with lowered hydrophobicity is completely outside the first area, providing an area of increased adhesion for the layer of wall material. The second area adheres the layer of wall material to the support plate and avoids peel off during the manufacture of the walls. After patterning of the layer, the layer may still cover at least part of the second area. In an embodiment the second area may enclose the first area.

During manufacture, the first area may be shielded from the hydrophobicity-lowering action by covering it with a mask.

In a variant of the previous embodiment the second area is partly outside the first area and partly in the first area. The adhesion of the layer of wall material to the support plate may be improved by lowering the hydrophobicity of an area outside the first area, where the plurality of picture elements are located, and an area inside the first area. The area inside the first area may have an extent which substantially overlaps the extent of the walls, i.e. the width of the area is substantially equal to the width of a wall and the length of the area may be shorter than the length of one picture element or equal to the length of one or more picture elements. In an embodiment the second area is a combination of an area enclosing the plurality of picture elements and one or more lines, that may form a grid or rectangles, in the first area.

In an embodiment the second area is within the first area. In this embodiment the second area coincides with the area between the picture elements, i.e. the area where the walls are made. The second area may have substantially an extent of the walls. The second area may have the form of a series of lines, which may form a grid or one or more rectangles. In a further embodiment the second area encircles all picture elements. The adhesion of the walls to the support plate is thereby improved.

When the second area forms an initiation area in the display region, the initiation area and the area having an improved adhesion for the wall material can be made in the same process step. In an embodiment of the method, substantially all display regions have such an initiation area. An initiation area is an area in the display region where the first fluid preferably starts moving when applying an electrical field, thereby acting as an initiation point; such an initiation area can be a small area with a lower hydrophobicity. The initiation area may be smaller than 10% of the display region of a picture element. The initiation area can be positioned anywhere in the display region and have any different shape, such as a square, rectangle or a quarter circle. In an embodiment, the initiation area is positioned directly next to a pixel wall. In another embodiment, the initiation area is positioned in a corner of the display region. The optical effect of the initiation point can be minimized or eliminated by using, for instance, a black matrix.

The method may include the step of lowering the hydrophobicity including reactive ion etching, plasma treatment, UV ozone treatment, or chemical treatment. The hydrophobicity of the surface can also be locally reduced by the application of adhesion promoters.

The lowering of the hydrophobicity may be carried out using a method having a controllable extent of application, such as local reactive ion etching or a local plasma treatment. Alternatively, a patterned layer may be used for screening off areas that must not be treated. In an embodiment of the method where the second area is at least partly within the first area and has substantially an extent of the walls, the part of the first area outside the second area is covered by a patterned layer preventing lowering of the hydrophobicity of the hydrophobic layer. In this embodiment of the method a patterned layer covers the part of the hydrophobic layer corresponding to the display regions. The action of hydrophobicity lowering will therefore only affect the area where the walls will be applied.

The patterned layer may be made using a photo-lithographic process.

The walls may be formed by depositing a layer of wall material on the hydrophobic layer.

The wall layer may be patterned by depositing wall layer material through a mask or by a photo-lithographic process on the hydrophobic layer.

In an embodiment of the method, the second area encloses the display regions and the step of forming the walls on the second area is done by a self-assembly process. The wall material is wet processed on the first area that has strong chemical contrast between the display regions and the second area and the properties of the wet wall material (a.o. viscosity, surface tension, boiling point) are chosen such that after the application of the wet layer, the wall material spontaneously deposits onto the second areas and not onto the display regions. The wall material can be a solution or a dispersion which becomes a solid wall after the solvent has evaporated. The wet layer can be applied in many ways, including submersing the substrate in the solution or dispersion or by bar coating, spin coating or slit coating.

Further embodiments relate to an electrowetting display device having a plurality of picture elements, each picture element being defined by walls surrounding a display region, the display device including a support plate covered by a hydrophobic layer having a hydrophobicity, the walls being part of a patterned wall layer arranged on the hydrophobic layer, where the hydrophobicity in an area where the wall layer is arranged varies between a high and a low value. The hydrophobicity of the hydrophobic layer is lowered at certain locations under the wall layer, i.e. in the second area, to improve adhesion between the wall material and the hydrophobic layer. At other locations under the patterned wall layer the hydrophobicity is at a similar high value as in the display regions. The local lowering of the hydrophobicity achieves an improved adhesion of the walls to the hydrophobic layer. A good adhesion of the wall material appears to be achievable without lowering the hydrophobicity of the entire area covered by the wall layer.

Other embodiments relate to an electrowetting display device having a plurality of picture elements, each picture element being defined by walls surrounding a display region, the display device including a support plate covered by a hydrophobic layer having a hydrophobicity, the walls being part of a patterned wall layer arranged on the hydrophobic layer, wherein the display region includes an initiation area, the hydrophobicity having a high value in an area of the display region outside the initiation area and a low value in the initiation area and in an area between the display regions.

A typical value for a high hydrophobicity in the case of a hydrophobic layer of fluoropolymer AF1600 is a receding contact angle of a water-air interface of more than 110° and which may be in the range from 110 to 125°; for a low hydrophobicity less than 70° and which may be between 30 and 70°.

FIG. 1 shows a diagrammatic cross-section of part of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate and may be rigid or flexible.

The display device has a viewing side 8 on which an image or display formed by the display device can be viewed and a rear side 9. In the Figure the first support plate 5 faces the rear side; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12. The second fluid is immiscible with the first fluid. The second fluid is electrically conductive or polar, and may be water or a salt solution such as a solution of potassium chloride in a mixture of water and ethyl alcohol. The second fluid may be transparent, but may be coloured, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or dye. Alternatively, the first fluid may be black, i.e. absorb substantially all parts of the optical spectrum, or reflecting. A reflective layer may reflect the entire visible spectrum, making the layer appear white, or part of it, making it have a colour.

A hydrophobic layer 13 is arranged on the support plate 5. The hydrophobic layer may be transparent or reflective. The layer is an uninterrupted layer extending over a plurality of picture elements 2, as shown in the Figure. The layer may be for instance an amorphous fluoropolymer layer such as AF1600 or another low surface energy polymer. The hydrophobic character causes the first fluid to adhere preferentially to the first support plate 5, since the first fluid has a higher wettability with respect to the surface of the hydrophobic layer 13 than the second fluid. Wettability relates to the relative affinity of a fluid for the surface of a solid.

Each element 2 includes an electrode 14 arranged on the support plate 5. The electrode 14 is separated from the fluids by an insulating cover layer, which may be the hydrophobic layer 13. Other layers may be arranged between the hydrophobic layer and the electrode. The electrode 14 can be of any desired shape or form. The electrode 14 is supplied with voltage signals by a signal line 15, schematically indicated in the Figure. A second signal line 16 is connected to an electrode which is in contact with the conductive second fluid 12. This electrode may be common to all elements, when they are fluidly interconnected by and share the second fluid, uninterrupted by walls. The picture elements 2 can be controlled by a voltage V applied between the signal lines 15 and 16. The electrodes 14 on the support plate 5 each are coupled to a display driving system. In a display device having the elements arranged in a matrix form, the electrodes can be coupled to a matrix of printed control lines on the first support plate.

The first fluid 11 is confined to one picture element by walls 17 that follow the cross-section of the picture element. Although the walls are shown as structures protruding from the support plate 5, they may also be a surface layer on the support plate that repels the first fluid, such as a hydrophilic layer. The walls may extend from the first to the second support plate but may also extend partly from the first support plate to the second support plate. The extent of the picture element, indicated by the dashed lines 3 and 4, is defined by the centre of the walls 17. The area between the walls of a picture element, indicated by the dashed lines 18 and 19, is called the display region 20, over which a display effect occurs.

When no voltage is applied between the electrodes, the first fluid 11 forms a layer between the walls 17, as shown in the Figure. Application of a voltage will contract the first fluid, for example against a wall as shown by the dashed shape 21 in the Figure. The controllable shape of the first fluid is used to operate the picture element as a light valve, providing a display effect over the display region 20.

Figure 2:
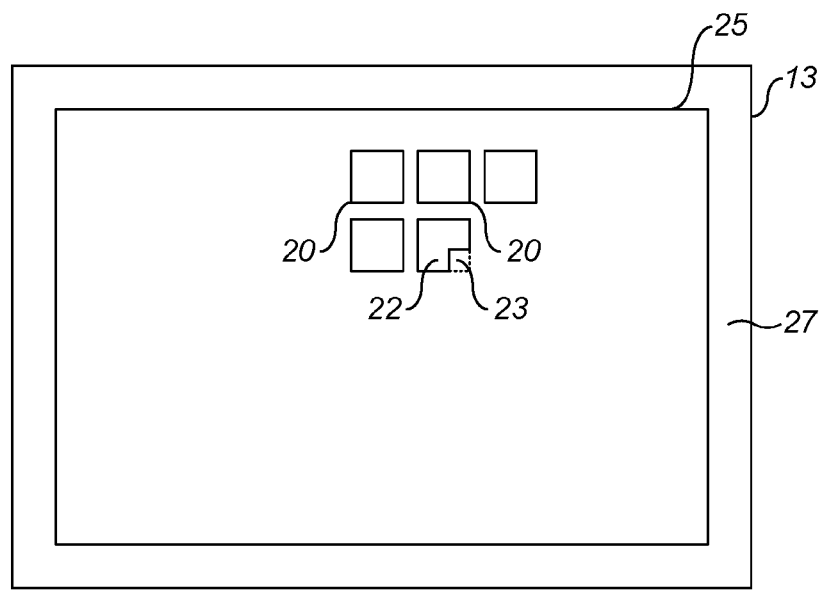
FIG. 2 shows a schematic view of the surface of a support plate of the display device.

FIG. 2 shows a schematic view of the surface of the support plate 5 along the line A-A in FIG. 1. The Figure shows the display regions 20 of five adjacent picture elements 2 in a matrix configuration. The plurality of display regions that form an image on the display covers a first area 25, also called display area, of the support plate. The walls 17 are arranged in the areas around the display regions 20.

Further details of the picture elements of the display are disclosed amongst others in international patent application WO 03071346.

During manufacture of a display device, the support plate 5 is provided with an electrode 14 for each picture element. Alternatively, the picture element may have more than one electrode. A display device of the active matrix type may have a plurality of layers arranged on the support plate 5, which form electrical connections, transistors, capacitors and the electrodes 14.

In a next step the hydrophobic layer 13 is applied on the electrode 14, for example by a wet coating process, such as flexoprinting, spin coating or dip coating. The layer provides a hydrophobic surface 26 in contact with the first fluid 11 and, depending on the configuration of the fluids, with the second fluid 12. The hydrophobic layer 13 covers the first area 25 of the plurality of picture elements, and may extend outside the first area as shown in FIG. 2. A protective layer in the form of a band, not shown in the Figure, may be applied on the edge of the hydrophobic layer 13 to avoid water penetrating between the hydrophobic layer, which may cause peeling off of the hydrophobic layer. Another method to avoid delamination is to use the following order of process steps: first fully cover the substrate with a hydrophobic layer, for instance by spin coating, next carry out the step of local surface modification and as a final step remove the fluoropolymer completely at specific locations outside the first area, such as the contact areas and locations between the first areas of the display devices when the substrate includes several display devices. The contact areas are the areas where the display device is connected to the driver electronics, for instance via an interconnect foil, a TCP or a driver IC that is bonded directly onto support plate 5.

Before applying the walls 17 on the hydrophobic layer 13, the surface 26 of the hydrophobic layer is treated locally to lower its hydrophobicity and thereby improve the adhesion between the material of the walls and the surface. The treatment may be carried out in a second area 27 of the hydrophilic layer 13 lying outside the first area 25. The second area 27 may encircle the first area 25, as shown in FIG. 2. Alternatively, the second area comprises several disconnected areas lying outside the first area 25.

Display region 22 in FIG. 2 shows an embodiment of the display device, wherein an initiation area 23 is arranged in one of the corners of the display region. The hydrophobicity of this initiation area is lowered together with the area for improved adhesion of the wall material. The initiation area is located within the display region, and the first fluid preferably starts moving at this area when a voltage is applied to the electrodes. When the hydrophobicity of the initiation area is very low, the first fluid may be expelled from this area both when no voltage and when a voltage is applied.

Figure 3:
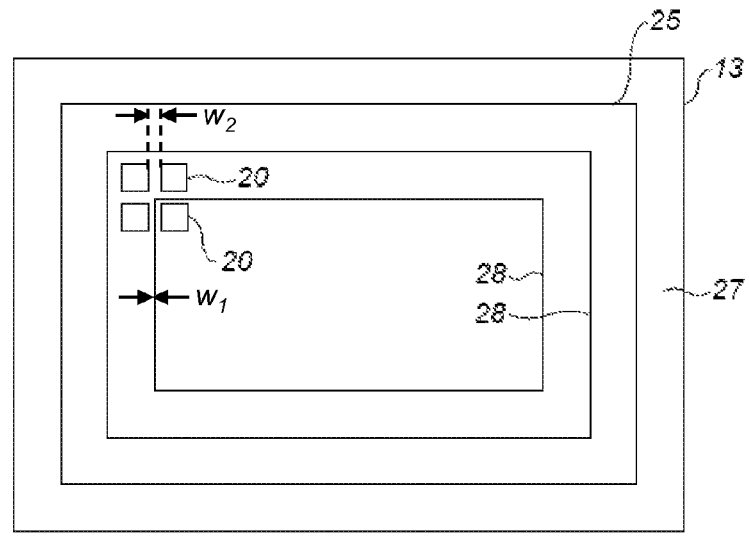
FIG. 3 shows an alternative embodiment of the surface of the support plate.

FIG. 3 shows an alternative arrangement of the second area of lowered hydrophobicity. The second area is formed by one or more rectangles 28 within the first area 25. The second area may also include the area 27. Each rectangle comprises four straight lines lying between the display regions 20, as schematically indicated in the Figure for one corner of the rectangle. The width $w_1$ of the lines may be equal to or smaller than the width $w_2$ of the walls 17, i.e. the width of the area between adjacent display regions 20. The width $w_2$ of a wall may be smaller than 20 micrometers and may be between 5 and 12 micrometers. The width $w_1$ of the lines may be larger than 5 micrometers. The width $w_1$ of the lines may be larger than the width $w_2$ of the walls, covering less than 10% of the area of the display region. However, the width $w_1$ may be equal to or 2 or 3 microns smaller than the width $w_2$ of walls. The above dimensions of the lines and walls apply to all embodiments where the second area is at least partly within the first area. Although the display regions are indicated in the Figure, at this stage of the process they are not yet present, because the walls, defining the display region, have not yet been applied on the support plate.

Figure 4:
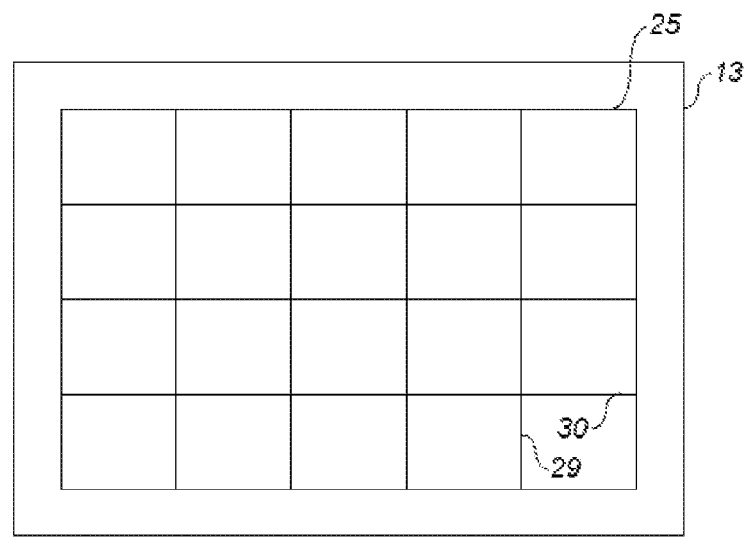
FIG. 4 shows another embodiment of the surface of the support plate.

FIG. 4 shows an embodiment of the second area, where it comprises a plurality of vertical lines 29 and horizontal lines 30, forming a grid over the first area 25. The lines lie between the picture elements and have a width similar to the width of the lines in FIG. 3. In an embodiment, the second area comprises the vertical and horizontal lines encircling all picture elements of the display device. A line in FIGS. 3 and 4 may also have the form of a dashed or dotted line. The lines in FIGS. 3 and 4 may be evenly spaced but do not necessarily have to be so; it is possible to use either horizontal or vertical lines. The second area may include the area 27 in these embodiments.

The lowering of the hydrophobicity in the second area can be carried out by treating the surface 26 locally by for example reactive ion etching, plasma treatment, UV ozone treatment or chemical treatment. The hydrophobicity of the surface can also be locally reduced by the application of adhesion promoters Some of these techniques have sufficient resolution to allow local treatment, for example by using a small source in the reactive ion etching or local plasma treatment. This is suited for the second area 27, such as shown in FIG. 2. When the extent of application of the treatment is relatively broad, parts of the surface 26 not to be treated can be covered by a mask. In FIG. 2 the mask may shield the first area 25, in which the picture elements are located.

A local treatment can also be achieved by applying a layer on the hydrophobic layer 13 that protects the hydrophobic layer against the treatment, and patterning the layer using for example known photo-lithographic techniques to uncover those areas of the surface 26 that must be treated. To this end a photo-lacquer is applied to the surface, using either spinning or another wet deposition technique or application of a dry photo-responsive material. After exposure, the material of the lacquer is removed in the second area by wet or dry etching. The hydrophobic layer is now modified in the second area using at least one of the above treatments. The adhesion of the walls to the surface over the second area may be further improved by applying two treatments, e.g. reactive ion etching and applying an adhesion promoter. The adhesion promoter may be applied over the entire surface 26 of the hydrophobic layer, including on top of the lacquer. At the end of the lithographic process the lacquer is removed. The removal will also remove any adhesion promoter in areas outside the second area.

Figure 5:
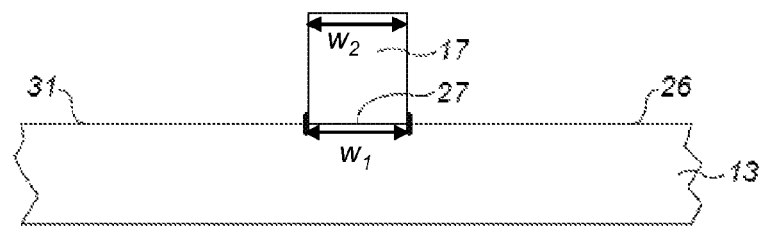
FIG. 5 shows a cross section of a wall on the surface.

After the local treatment of the surface 26 of the hydrophobic layer 13, the surface will have a second area 27 with a width $w_1$ with lowered hydrophobicity and a neighbouring area 31 having a surface as pristine as when the hydrophobic layer was applied onto the substrate, as shown in FIG. 5. The walls 17 will now be applied to the support plate with a width $w_2$. The walls may be applied using a known process, which may include embossing, printing or a photo-lithographic technique similar to the technique applied for the protective layer used in the local treatment of the surface. See for example the article by K. Zhou et al. in J. Micromech. Microeng. 19, 065029 (2009). When lines between display regions have been treated, such as in the embodiments of FIG. 3 or 4 or where the second area encloses each picture element, the patterning of the walls must be aligned with the patterning in the treatment to achieve a positioning of the walls 17 on the treated, second, areas 27, as shown in FIG. 5. Any small misalignment may result in a small lowering of the adhesion of the wall when it is arranged outside the second area and may also lead to incorporation of a treated surface in the display region which may lead to a reduction of the lifetime of the display. However, no danger of short-circuit exists as in a known display device because the hydrophobic layer is uninterrupted under the walls.

The walls may also be applied to the surface 26 in the second areas 27 by self-assembly. The surface may be treated such that the second area of lower hydrophobicity encloses all display regions. The chemical contrast between the second area and the wall material should be as high as possible, for instance by applying two of the above treatments or by using a stronger version of one of these treatments. This strong chemical contrast between the display regions and the second area should be combined with specific properties of the wet wall material (a.o. low viscosity, high surface tension and high boiling point). These properties are chosen such that after the application of the wet layer, the material spontaneously moves onto the second areas, thereby removing itself from the display regions. The choice of solvent is important; it may be aqueous, for example KOH or water. The wall material used can be in a solution or a dispersion. Many wall materials can be used, including pigment particles, carbon black, TiO or molecular materials, such as SU-8 and other photo-lacquers. These materials will become a solid wall 17 after the solvent has been removed, e.g. by draining or evaporation. The application of the wet layer can be done in several ways, including submersing the substrate in the solution or dispersion or by bar coating, spin coating or slit coating.

When the support plate 5 is provided with the wall structure, the display device can be completed by carrying out the steps of filling the picture elements with the first fluid and second fluid, assembling the first support plate and the second support plate, and sealing the cavity between the two support plates. Circuits for controlling the voltage on the electrodes may be arranged on the first support plate. The display device may be part of a display apparatus, which apparatus includes a display driving system connected to the circuits on the first support plate.

The above embodiments are to be understood as illustrative examples. Further embodiments are envisaged. For example, use of the method for making electrowetting devices other than displays. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising:
    a picture element having:
        a first fluid;
        a second fluid immiscible with the first fluid, a configuration of the first fluid and the second fluid controllable with an applied voltage; and
        at least one electrode for providing the applied voltage,
    a hydrophobic layer with a surface, part of the surface being a display region of the picture element adjoined by at least one of the first fluid or the second fluids; and
    a wall layer on the hydrophobic layer, the wall layer comprising at least one wall substantially surrounding the display region,
    a first part of the wall layer located on a first area of the surface having a first area hydrophobicity and a second part of the wall layer located on a second area of the surface having a second area hydrophobicity
    wherein the second area hydrophobicity is lower than the first area hydrophobicity.

2. An electrowetting display device according to claim 1, the wall layer adhered to the hydrophobic layer, with adhesion of the second part of the wall layer to the second area of the surface greater than adhesion of the first part of the wall layer to the first area of the surface.

3. An electrowetting display device according to claim 1, comprising a plurality of picture elements, the plurality of picture elements comprising the picture element, different parts of the first area respectively corresponding to a respective display region of a respective picture element of the plurality of picture elements, and a first area part of the first area adjoining the first part of the wall layer, wherein, in a plane of the surface, the second area is outside the first area and the first part of the wall layer located on the first area of the surface comprises the at least one wall, the at least one wall comprising respective walls substantially surrounding the respective display region of each respective picture element of the plurality of picture elements.

4. An electrowetting display device according to claim 3, wherein the second area is one of:
    a continuous area surrounding the first area of the picture element, or
    a plurality of separate areas.

5. An electrowetting display device according to claim 1, comprising a plurality of picture elements, the picture element being a first picture element of the plurality of picture elements, and the display region being a first display region, the plurality of picture elements further comprising:
    a second picture element adjacent to the first picture element and comprising a second display region, wherein, in a plane of the surface, the first area and the second area of the surface on which the first part and the second part of the wall layer are located, respectively, are located between the first display region and the second display region.

6. An electrowetting display device according to claim 5, a wall of the at least one wall located between the first display region of the first picture element and the second display region of the second picture element, wherein a second area width of the second area is less than a wall width of the wall, the second area width and the wall width being taken parallel to each other.

7. An electrowetting display device according to claim 1, wherein a wall width of a wall of the at least one wall is one of less than 20 micrometers or in the range 5 to 12 micrometers.

8. An electrowetting display device according to claim 1, wherein a second area width of the second area is one of: larger than 5 micrometers, 2 micrometers smaller than a wall width of a wall of the at least one wall or 3 micrometers smaller than the wall width of the wall.

9. An electrowetting display device according to claim 1, wherein the second area has one of:
    a grid shaped form, or
    a rectangular and linear form.

10. An electrowetting display device according to claim 1, comprising an adhesion promoter between the second part of the wall layer and the second area of the surface.

11. An electrowetting display device according to claim 1, wherein the second area extends from beneath the wall layer and comprises part of the display region which is less than 10% of an area of the display region and which is an initiation area for setting a location where initiation of movement of the first fluid and the second fluid occurs upon applying the applied voltage.

12. An electrowetting display device according to claim 11, wherein the initiation area is located at one or more of:
    a corner of the display region, or
    along a side of the display region.

13. An electrowetting display device according to claim 11, wherein the initiation area has a form of one of a square, a rectangle or a quarter circle.

14. An electrowetting display device according to claim 1, wherein the hydrophobic layer is of at least one of AF1600 or a low surface energy polymer.

15. An electrowetting display device according to claim 1, wherein the hydrophobic layer is located on one of: the at least one electrode, or at least one layer located on the at least one electrode.

16. An electrowetting display device according to claim 1, comprising a plurality of picture elements, the plurality of picture elements comprising the picture element, the at least one wall forming a grid shaped wall structure.

17. An electrowetting display device according to claim 1, the hydrophobic layer located on one of:
    the at least one electrode; or
    at least one layer located on the at least one electrode, wherein at least one of:
    a surface hydrophobicity of a surface of the hydrophobic layer adjoining, respectively, the at least one electrode or the at least one layer located on the at least one electrode; or
    an interior region hydrophobicity of an interior region of the hydrophobic layer, is substantially equal to a hydrophobicity of the part of the surface being a display region of the picture element adjoined by at least one of the first fluid or the second fluid.

18. An electrowetting display device according to claim 1, wherein the first area of the surface is substantially untreated to have the first area hydrophobicity, after deposition of a precursor layer for forming the hydrophobic layer, compared with the second area having the second area hydrophobicity from a hydrophobicity lowering treatment.

19. An electrowetting display device comprising:
a picture element comprising:
a first fluid;
a second fluid immiscible with the first fluid, a configuration of the first fluid and the second fluid controllable with an applied voltage; and
at least one electrode for providing the applied voltage,
a hydrophobic layer with a surface, part of the surface being a display region of the picture element adjoined by at least one of the first fluid or the second fluid; and
a wall layer on the hydrophobic layer, the wall layer comprising at least one wall substantially surrounding the display region, at least part of the wall layer located on a different part of the surface having a lower hydrophobicity than the part of the surface being the display region of the picture element adjoined by at least one of the first fluid or the second fluid,
the hydrophobic layer located on one of:
the at least one electrode; or
at least one layer located on the at least one electrode,
wherein at least one of:
a surface hydrophobicity of a surface of the hydrophobic layer adjoining, respectively, the at least one electrode or the at least one layer located on the at least one electrode; or
an interior region hydrophobicity of an interior region of the hydrophobic layer, is substantially equal to a hydrophobicity of the part of the surface being the display region of the picture element adjoined by at least one of the first fluid or the second fluid.

20. An electrowetting display device comprising:
a picture elements comprising:
a first fluid;
a second fluid immiscible with the first fluid, a configuration of the first fluid and the second fluid controllable with an applied voltage; and
at least one electrode for providing the applied voltage,
a hydrophobic layer with a surface, part of the surface being a display region of the picture element and adjoined by at least one of the first fluid or the second fluid; and
a wall layer on the hydrophobic layer, the wall layer comprising at least one wall substantially surrounding the display region, at least part of the wall layer located on a different part of the surface having a lower hydrophobicity than the part of the surface being the display region of the picture element adjoined by at least one of the first fluid or the second fluid,
wherein the part of the surface being a display region of the picture element and adjoined by at least one of the first fluid or the second fluid is substantially untreated to have a first hydrophobicity, after deposition of a precursor layer for forming the hydrophobic layer, compared with the different part of the surface having the lower hydrophobicity from a hydrophobicity lowering treatment.

* * * * *